(12) United States Patent
Gaughan et al.

(10) Patent No.: US 10,960,870 B2
(45) Date of Patent: Mar. 30, 2021

(54) VEHICLE BRAKE CYLINDER MONITORING SYSTEM AND METHOD

(71) Applicant: Westinghouse Air Brake Technologies Corporation, Wilmerding, PA (US)

(72) Inventors: Edward W. Gaughan, Greensburg, PA (US); William John Potter, Trafford, PA (US); Vincent F. Troiani, New Florence, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 175 days.

(21) Appl. No.: 16/127,762

(22) Filed: Sep. 11, 2018

(65) Prior Publication Data

US 2020/0079342 A1 Mar. 12, 2020

(51) Int. Cl.
*B60T 17/22* (2006.01)
*B60T 13/24* (2006.01)
*G01L 19/08* (2006.01)
*H04Q 9/00* (2006.01)
*B61H 13/34* (2006.01)

(52) U.S. Cl.
CPC ............ *B60T 17/228* (2013.01); *B60T 13/24* (2013.01); *B60T 17/221* (2013.01); *B61H 13/34* (2013.01); *G01L 19/086* (2013.01); *H04Q 9/00* (2013.01); *B60T 2270/88* (2013.01); *H04Q 2209/47* (2013.01)

(58) Field of Classification Search
CPC ...... B60T 17/228; B60T 17/221; B60T 17/12; B60T 13/24; B60T 2270/88; B60T 8/1893; B60T 8/185; B60T 8/3235; B60T 8/1705; B60T 8/1737; H04Q 2209/47; H04Q 9/00; B61H 13/34; B61H 13/20; G01L 19/086; G06F 11/30
USPC .............. 303/7, 8, 9.69, 127, 128, 131, 135; 701/19, 20
See application file for complete search history.

(56) References Cited

U.S. PATENT DOCUMENTS

| 4,361,825 A | 11/1982 | Shockley |
| 4,487,060 A * | 12/1984 | Pomeroy ............... B60T 17/228 246/169 R |
| 5,808,909 A * | 9/1998 | Rees ...................... B60T 17/228 246/169 R |
| 6,175,784 B1 | 1/2001 | Jicha et al. |
| 6,837,550 B2 * | 1/2005 | Dougherty ............ B60T 13/665 303/124 |
| 7,155,172 B2 * | 12/2006 | Scott .................... G06K 7/0008 455/70 |

(Continued)

FOREIGN PATENT DOCUMENTS

EP    0729872 A2 *  9/1996

*Primary Examiner* — Pamela Rodriguez
(74) *Attorney, Agent, or Firm* — Philip S. Hof; The Small Patent Law Group, LLC (57) ABSTRACT

A system and method for monitoring air pressure applied to a brake cylinder of a braking assembly of a railway vehicle, including an empty-load device, and an RFID transducer in communication with the empty-load device, wherein the RFID transducer is configured to measure the air pressure delivered to the brake cylinder of the braking assembly, and generate data on the air pressure delivered to the brake cylinder of the braking assembly; and a remote data monitor configured to read data from the RFID transducer.

19 Claims, 8 Drawing Sheets

(56) References Cited

U.S. PATENT DOCUMENTS

| | | |
|---|---|---|
| 7,315,770 B2 | 1/2008 | Wade et al. |
| 7,769,509 B2 * | 8/2010 | Gaughan ............... B60T 17/228 |
| | | 701/33.4 |
| 9,020,667 B2 | 4/2015 | Haas et al. |
| 2002/0049520 A1 | 4/2002 | Mays |
| 2004/0122566 A1 | 6/2004 | Horst et al. |
| 2006/0290199 A1 * | 12/2006 | Beck ................... B61L 15/0081 |
| | | 303/7 |
| 2009/0326746 A1 | 12/2009 | Mian |
| 2012/0259488 A1 | 10/2012 | Siddappa et al. |
| 2013/0054158 A1 | 2/2013 | Toms |
| 2013/0332012 A1 | 12/2013 | Haas et al. |
| 2014/0129060 A1 | 5/2014 | Cooper et al. |

\* cited by examiner

VEHICLE BRAKE CYLINDER MONITORING SYSTEM AND METHOD

BACKGROUND OF THE DISCLOSURE

Field of the Disclosure

The present disclosure relates generally to brake monitoring systems, methods, and arrangements for use in connection with an air brake arrangement and, in particular, to a system method, and arrangement for monitoring regulated air pressure delivered to an air brake arrangement for a train, railcar, railway vehicle, and similar vehicles, and preferably an air brake arrangement for a railway vehicle including an empty-load device.

Description of the Related Art

As discussed in U.S. Pat. No. 9,020,667, the disclosure of which is incorporated by reference, braking systems and arrangements are required for slowing and stopping vehicles, such as cars, trucks, trains, railcars, railway vehicles, and the like. With specific respect to trains and other railway vehicles, a conventional braking system is normally in the form of a pneumatically-driven arrangement (or "air brake arrangement") having mechanisms and components that interact with each railcar. A schematic representation of a known pneumatic air brake arrangement 100 is illustrated in FIG. 1.

Figure 1:
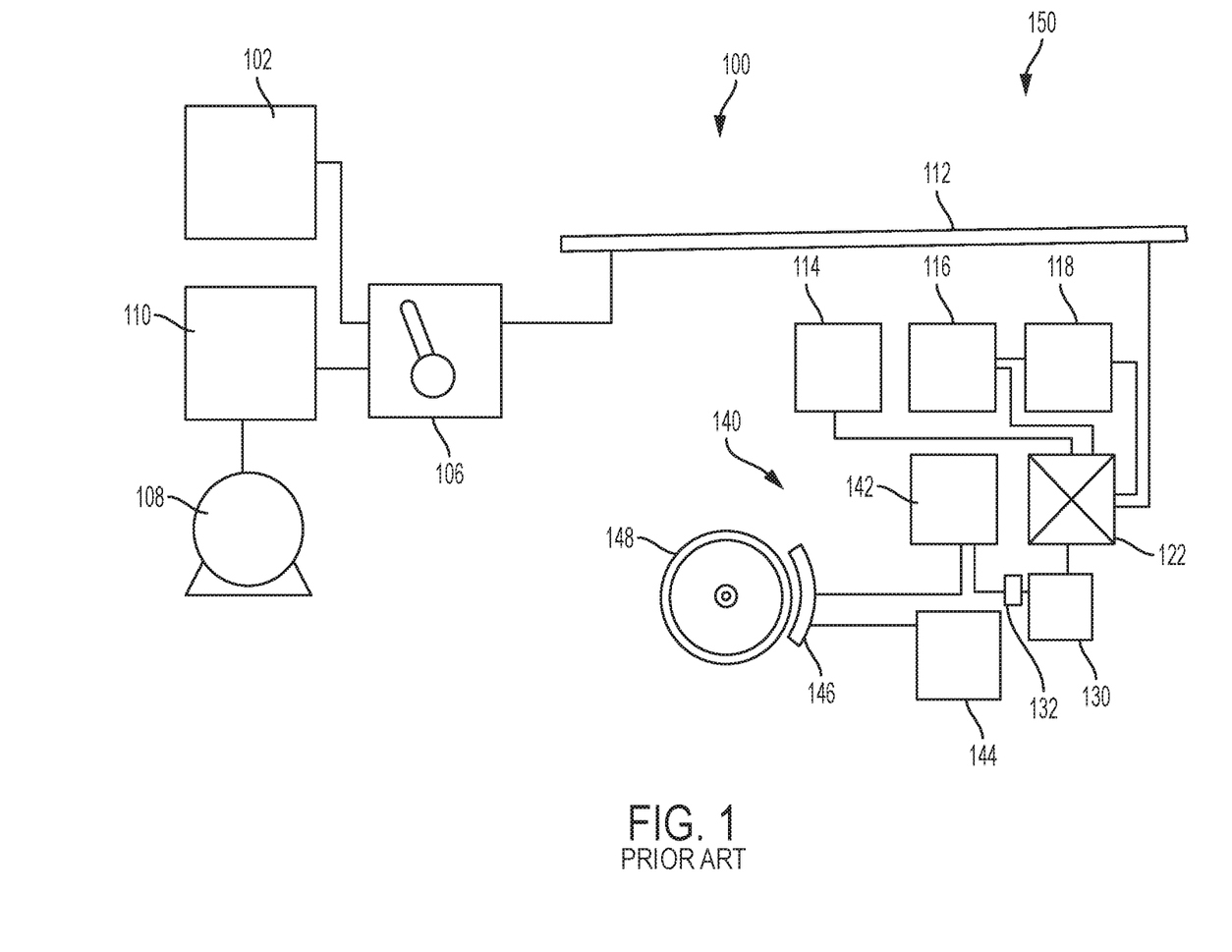
FIG. 1 is a schematic view of a known air brake arrangement for a train.

With reference to FIG. 1, the operator of a train 150 also has control over the air brake arrangement 100 through the use of an operator control valve 106. Through the movement of a handle associated with the control valve 106, the operator can adjust the amount of braking to be applied in the air brake arrangement 100. The higher the braking force selected, the faster the braking arrangement 100 will attempt to slow and stop the train 150.

In certain conventional air brake applications, in order to provide the appropriate compressed air to the system, the air brake arrangement 100 also includes a compressor 108 for providing compressed air to a main reservoir 110, which is in communication with the operator control valve 106. Further, an equalizing reservoir 102 also is in communication with the operator control valve 106. Whether through the main reservoir 110 or the equalizing reservoir 102, compressed air is supplied through the operator control valve 106 to a brake pipe 112 that extends along and is associated with each railcar. Each railcar includes an arrangement that allows an auxiliary reservoir 116 to be charged with air via a valve arrangement 122, such as a control valve, as well as a braking assembly 140, such as a brake cylinder 142, which is in communication with the valve arrangement 122. The brake cylinder 142 is operable to urge a brake shoe mechanism 146 against a surface of the wheel 148. The air brake arrangement 100 also may include a manual parking brake 144. The air brake arrangement 100 also may be in fluid communication with one or more hatch reservoirs 114, which provide air to a pneumatically-operable hatch or door of the railcar.

In operation, the brake pipe 112 is continually charged to maintain a specific pressure, e.g., 90 pounds per square inch ("psi"), and each auxiliary reservoir 116 and emergency reservoir 118 (which may be combined into a single volume, or combined reservoir) are similarly charged from the brake pipe 112. In order to brake the train 150, the operator actuates the operator control valve 106 and removes air from the brake pipe 112, thereby reducing pressure to a lower level, e.g., 80 psi. The valve arrangement 122 stops charging the auxiliary reservoir 116 and transfers air from the auxiliary reservoir 116 to the brake cylinder 142. Normally using a piston-operable arrangement, the brake cylinder 142 urges the brake shoe mechanism 146 against the wheel 148. An operator may adjust the level of braking using the operator control valve 106, since the amount of pressure removed from the brake pipe 112 results in a specific pressure in the brake cylinder 142, which results in a specific application force of the brake shoe mechanism 146 against the wheel 148. Using the above-described air brake arrangement 100, the train can be slowed and/or stopped during operation and as it traverses the track.

Figure 2A:
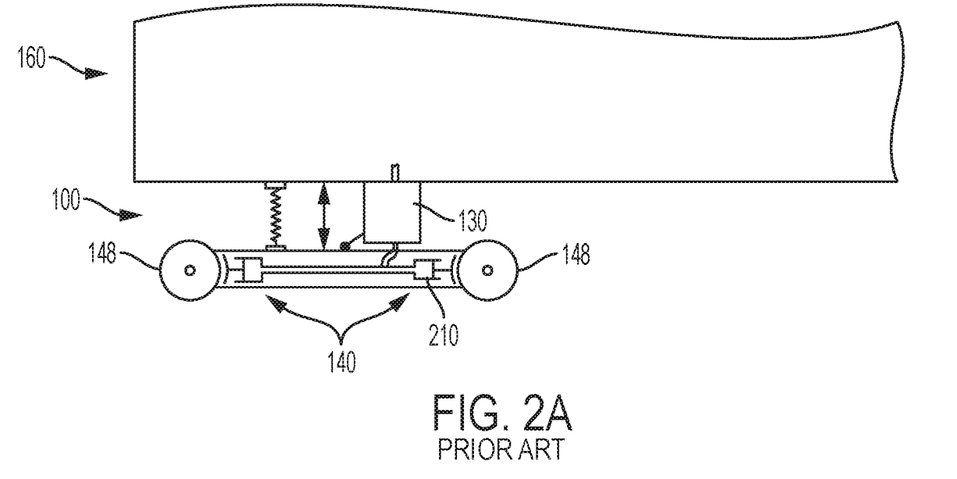
FIG. 2A is a schematic view of a known air brake arrangement for a train.
Figure 2B:
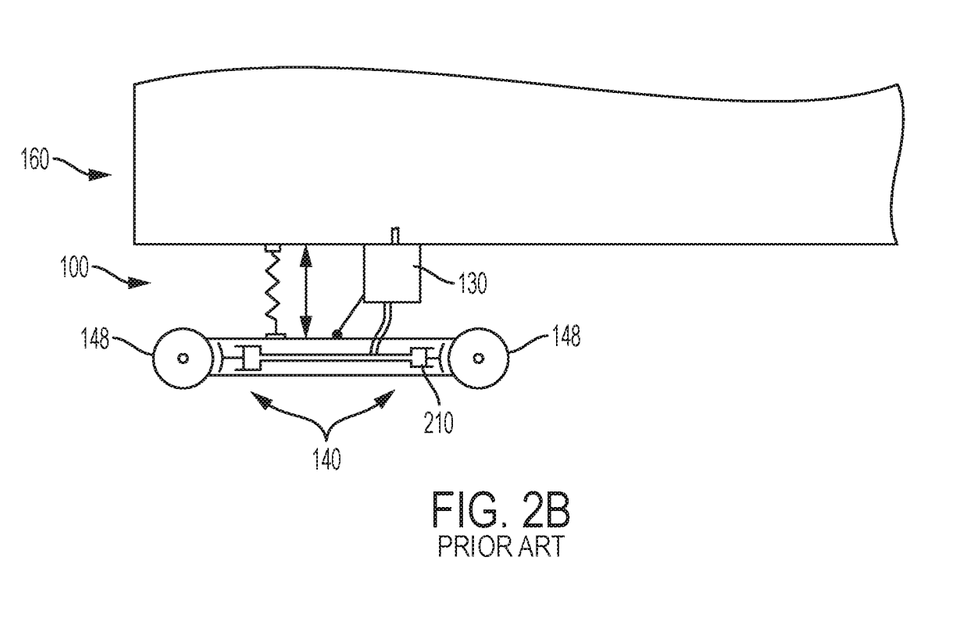
FIG. 2B is a schematic view of the air brake arrangement of FIG. 2A in which the railcar is in a unloaded state.

Further, it is understood that the weight of a freight car can vary drastically, such that a loaded railcar 160, as shown in FIG. 2A, may weigh 3-4 times the weight of an empty railcar 160 as shown in FIG. 2B. Accordingly, the amount of pressure in the brake cylinder 142 needed to stop a loaded railcar is much higher than the pressure needed to stop an empty railcar. Accordingly, if the amount of pressure needed to stop a loaded railcar were applied to an empty car, the wheels 148 could skid, causing damage to the wheels 148 and the track. Similarly, if the amount of pressure needed to stop an empty car were applied to a loaded or partially loaded car, the braking performance would be reduced, potentially to the point where the railcar might not stop at all (for example, when the car is braking on a grade). In order to address this issue, and with continued reference to FIG. 1, conventional freight cars are normally equipped with an empty-load device 130. Such an empty-load device 130 is configured to regulate pressure delivered to the brake cylinder 142 when a railcar is empty. When a railcar is loaded, the empty-load device 130 allows for full pressure (or full application) to be delivered to the brake cylinder 142.

As is known, the empty-load device 130 may use the height of the railcar body as the mechanical input to a regulator switch between "empty" and "loaded" settings. For example, the sensor arrangement may be in the form of a lever or arm that rotates or moves based upon the height of the car body with respect to the truck 210 of the braking assembly 140. FIG. 2A schematically shows a railcar 160 that is in a loaded condition. The height of the car body with respect to the truck 210 is sufficiently low such that the empty-load device 130, triggered by the sensor arrangement, allows a greater air pressure to be applied to the brake cylinder 142 of the braking assembly 140.

FIG. 2B schematically shows a railcar 160 in an unloaded condition. The height of the car body with respect to the truck 210 is sufficiently high such that the empty-load device 130, triggered by the sensor arrangement, regulates air pressure to be applied to the brake cylinder 142 of the braking assembly 140, so that a lesser amount of braking force is applied than in the loaded condition shown in FIG. 2A. In addition, it is noted that empty-load devices 130 are available with different regulation amounts. For example, some empty-load devices 130 may regulate the "downstream" pressure to 50% of the "upstream" pressure when an empty car is detected, while others may regulate the "downstream" pressure to some other percentage of "upstream" pressure, e.g., 30%, 35%, 60%, 40%, and the like.

In order to ensure that the desired force is being applied during braking operations, it is desirable to monitor the air pressure delivered downstream of the empty-load device 130. However, monitoring the amount of regulated air pressure delivered to a brake cylinder 142 in a conventional pneumatic air brake arrangement 100 according to known systems and methods may be accomplished only by manually applying a gauge or transducer to the brake cylinder pressure test point 132 on each railcar. The test point 132 is schematically shown in FIG. 1. Monitoring regulated pressure in this manner is time-consuming and labor intensive.

SUMMARY OF THE DISCLOSURE

In view of the foregoing, there is a need in the industry to efficiently and cost-effectively ensure that the appropriate regulated air pressure is being delivered to the brake cylinder, or other air-operable braking assembly, in a pneumatic air brake arrangement. There is also a need to monitor the amount of regulated air pressure delivered to a brake cylinder during a braking operation. Further, there exists a need in the industry to detect the proper operation, failure, and/or need for maintenance of the empty-load device.

Generally, provided is a system and method for monitoring regulated air pressure applied to the brake cylinder of an air-operable braking assembly.

Therefore, in one example, provided is a system for monitoring a regulated air pressure applied to at least one brake cylinder of at least one air-operable braking assembly of a train with at least one railcar. The system includes at least one empty-load device. The empty load device includes at least one braking assembly input exhibiting a delivered air pressure. The empty load device includes a regulation arrangement configured to regulate air pressure. The empty load device includes an at least one braking assembly output exhibiting a regulated air pressure. The system includes a first radio-frequency identification ("RFID") transducer in communication with the regulated air pressure from the at least one braking assembly output. The first RFID transducer is configured to measure the regulated air pressure delivered to the at least one brake cylinder of the at least one air-operable braking assembly. The system includes at least one remote data monitor. The remote data monitor is configured to read data from the first RFID transducer.

In another example consistent with the present disclosure, provided is a method for monitoring a regulated air pressure. The regulated air pressure may be applied to at least one brake cylinder of at least one air-operable braking assembly of a train with at least one railcar. The method includes the step of delivering air pressure to at least one braking assembly input of at least one empty-load device. The method further includes the step of regulating the delivered air pressure with a regulation arrangement of the at least one empty-load device to result in a regulated air pressure. The method further includes the step of delivering the regulated air pressure from at least one braking assembly output of the empty-load device to the at least one brake cylinder. The method further includes the step of sensing the regulated air pressure with a first RFID transducer in communication with the regulated air pressure. The method further includes the step of generating data on the regulated air pressure being delivered to the at least one brake cylinder. The method further includes the step of reading the data from the first RFID transducer with a remote data monitor.

In yet another example consistent with the present disclosure, provided is an air brake arrangement. The arrangement includes at least one air-operable braking assembly for braking at least one wheel of a railcar. The arrangement further includes at least one empty-load device. The empty-load device includes at least one braking assembly input exhibiting a delivered air pressure. The empty-load device includes a regulation arrangement configured to regulate air pressure. The empty-load device includes an at least one braking assembly output exhibiting a regulated air pressure. The arrangement further includes a first RFID transducer in communication with the regulated air pressure from the at least one braking assembly output. The first RFID transducer is configured to sense the regulated air pressure delivered to the at least one brake cylinder of the at least one air-operable braking assembly. The first RFID transducer is configured to generate data on the regulated air pressure delivered to the at least one brake cylinder of the at least one air-operable braking assembly. The arrangement further includes a remote data monitor. The remote data monitor is configured to read data from the first RFID transducer.

In another example consistent with the present disclosure, provided is a system for monitoring an air pressure applied to at least one brake cylinder of at least one braking assembly of a railway vehicle, including the at least one brake cylinder; at least one empty-load device, and an RFID transducer in communication with the at least one empty-load device, wherein the RFID transducer is located downstream of the at least one empty-load device, and wherein the RFID transducer is configured to measure the air pressure delivered to the at least one brake cylinder of the at least one braking assembly, and generate data on the air pressure delivered to the at least one brake cylinder of the at least one braking assembly; and at least one remote data monitor configured to read data from the RFID transducer.

In a further example consistent with the present disclosure, provided is a method for monitoring air pressure applied to at least one brake cylinder of at least one braking assembly of a train with at least one railcar, including delivering a delivered air pressure to at least one empty-load device; regulating the delivered air pressure with a regulation arrangement of the at least one empty-load device to result in a regulated air pressure; delivering the regulated air pressure from the at least one empty-load device to the at least one brake cylinder; measuring the regulated air pressure with an RFID transducer downstream of the at least one empty-load device; and reading the measurement from the RFID transducer with a remote data monitor.

In yet another example consistent with the present disclosure, provided is a railway vehicle including at least one braking assembly for braking at least one wheel of a railcar; at least one brake cylinder; at least one empty-load device, and an RFID transducer in communication with the at least one empty-load device, wherein the RFID transducer is located downstream of the at least one empty-load device, and wherein the RFID transducer is configured to: measure the air pressure delivered to the at least one brake cylinder of the at least one braking assembly, and generate data on the air pressure delivered to the at least one brake cylinder of the at least one braking assembly; and at least one remote data monitor configured to read data from the RFID transducer.

Non-limiting examples consistent with the present disclosure further may be characterized by one or more of the following clauses:

Clause 1: A system for monitoring a regulated air pressure applied to at least one brake cylinder of at least one air-operable braking assembly of a train with at least one railcar, the system comprising at least one empty-load device comprising at least one braking assembly input exhibiting a delivered air pressure, a regulation arrangement configured to regulate air pressure, and at least one braking assembly output exhibiting a regulated air pressure; a first RFID transducer in communication with the regulated air pressure from the at least one braking assembly output, configured to sense the regulated air pressure delivered to the at least one brake cylinder of the at least one air-operable braking assembly, and generate data on the regulated air pressure delivered to the at least one brake cylinder of the at least one air-operable braking assembly; and at least one remote data monitor configured to read data from the first RFID transducer.

Clause 2: The system according to clause 1, wherein the at least one remote data monitor includes a handheld RFID reader.

Clause 3: The system according to any of clauses 1 and 2, wherein the at least one remote data monitor includes a stationary RFID reader configured to read data from the first RFID transducer as the at least one railcar passes the remote data monitor.

Clause 4: The system according to any of clauses 1 to 3, wherein the remote data monitor comprises a transmitter configured to transmit data to a remote database.

Clause 5: The system according to any of clauses 1 to 4, wherein the first RFID transducer comprises a passive RFID system.

Clause 6: The system according to claims 1 to 4, wherein the first RFID transducer comprises an active RFID system in wired connection with a power source.

Clause 7: The system according to clause 6, wherein the first RFID transducer further comprises a transmitter configured to transmit data to a remote database.

Clause 8: The system according to any of clauses 1 to 7, wherein the first RFID transducer is disposed on the empty-load device.

Clause 9: The system according to any of clauses 1 to 8, wherein the first RFID transducer is disposed on the brake cylinder.

Clause 10: The system according to any of clauses 1 to 9, further comprising a second RFID transducer in communication with the delivered air pressure, configured to sense the delivered air pressure and generate data on the delivered air pressure.

Clause 11: The system according to clause 10, wherein the at least one remote data monitor is configured to read data from the second RFID transducer.

Clause 12: The system according to any of clauses 10 and 11, wherein the second RFID transducer is disposed on a control valve of the system.

Clause 13: A method for monitoring a regulated air pressure applied to at least one brake cylinder of at least one air-operable braking assembly of a train with at least one railcar, comprising the steps of delivering a delivered air pressure to at least one braking assembly input of at least one empty-load device; regulating the delivered air pressure with a regulation arrangement of the at least one empty-load device to result in a regulated air pressure; delivering the regulated air pressure from at least one braking assembly output of the empty-load device to the at least one brake cylinder; sensing the regulated air pressure with a first RFID transducer in communication with the regulated air pressure; generating data on the regulated air pressure delivered to the at least one brake cylinder; and reading the data from the first RFID transducer with a remote data monitor Clause 14: The method according to clause 13, wherein the remote data monitor comprises a handheld RFID reader.

Clause 15: The method according to any of clauses 13 to 14, wherein the at least one remote data monitor comprises a stationary RFID reader configured to read data from the first RFID transducer as the at least one railcar passes the remote data monitor.

Clause 16: The method according to any of clauses 13 to 15, wherein the remote data monitor comprises a transmitter, and further comprising the step of transmitting data from the reader to a remote database.

Clause 17: The method according to any of clauses 13 to 16, wherein the first RFID transducer is disposed on the empty-load device.

Clause 18: The method according to any of clauses 13 to 16, wherein the first RFID transducer is disposed on the brake cylinder.

Clause 19: The method according to any of clauses 13 to 18, further comprising the steps of sensing the delivered air pressure with a second RFID transducer in communication with the delivered air pressure; generating data on the delivered air pressure; and reading the data from the second RFID transducer with the remote data monitor.

Clause 20: An air brake arrangement comprising at least one air-operable braking assembly for braking at least one wheel of a railcar; at least one empty-load device comprising at least one braking assembly input exhibiting a delivered air pressure, a regulation arrangement configured to regulate air pressure, and at least one braking assembly output exhibiting a regulated air pressure; a first RFID transducer in communication with the regulated air pressure from the at least one braking assembly output, configured to sense the regulated air pressure delivered to the at least one brake cylinder of the at least one air-operable braking assembly, and generate data on the regulated air pressure delivered to the at least one brake cylinder of the at least one air-operable braking assembly; and a remote data monitor configured to read data from the first RFID transducer.

Clause 21: The system according to any of clauses 1 to 12, wherein the at least one remote data monitor reads data from the first RFID transducer by polling the first RFID transducer.

Clause 22: The system according to any of clauses 13-19, further comprising the step of polling the first RFID transducer.

Clause 23: A train comprising a plurality of railcars, each railcar comprising at least one brake cylinder of at least one air-operable braking assembly, and a system for monitoring regulated air pressure applied brake cylinders, each system comprising at least one empty-load device comprising at least one braking assembly input exhibiting a delivered air pressure, a regulation arrangement configured to regulate air pressure, and at least one braking assembly output exhibiting a regulated air pressure; a first RFID transducer in communication with the regulated air pressure from the at least one braking assembly output, configured to sense the regulated air pressure being delivered to the at least one brake cylinder of the at least one air-operable braking assembly, and generate data on the regulated air pressure delivered to the at least one brake cylinder of the at least one air-operable braking assembly; and at least one remote data monitor configured to read data from the first RFID transducer of each system.

Clause 24: A system for monitoring an air pressure applied a brake cylinder of a braking assembly of a railway vehicle, the system comprising: the brake cylinder; an empty-load device, and: an RFID transducer in communication with the empty-load device, wherein the RFID transducer is located downstream of the empty-load device, and wherein the RFID transducer is configured to: measure the air pressure delivered to the brake cylinder of the braking assembly, and generate data on the air pressure delivered to the brake cylinder of the assembly; and a remote data monitor configured to read data from the RFID transducer.

Clause 25: The system according to clause 24, wherein the remote data monitor comprises one or more of a handheld RFID reader and a stationary RFID reader configured to read data from the RFID transducer as at least one railcar of the railway vehicle passes the remote data monitor.

Clause 26: The system according to any of clauses 24 to 25, wherein the empty-load device comprises: a braking assembly input exhibiting a delivered air pressure, a regulation arrangement configured to regulate air pressure, and a braking assembly output exhibiting a regulated air pressure.

Clause 27: The system according to any of clauses 24 to 26, wherein the remote data monitor comprises a transmitter configured to transmit data to a remote database.

Clause 28: The system according to any of clauses 24 to 27, wherein the RFID transducer comprises a passive RFID system.

Clause 29: The system according to any of clauses 24 to 27, wherein the RFID transducer further comprises an active RFID system in wired connection with a power source.

Clause 30: The system according to clause 29, wherein the RFID transducer further comprises a transmitter configured to transmit data to a remote database.

Clause 31: The system according to any of clauses 24 to 30, wherein the RFID transducer is disposed on the empty-load device.

Clause 32: The system according to any of clauses 24 to 30, wherein the RFID transducer is disposed on the brake cylinder.

Clause 33: The system according to any of clauses 24 to 32, further comprising a second RFID transducer upstream of the empty-load device, the second RFID transducer configured to: measure the air pressure upstream of the empty-load device; and generate data on the air pressure.

Clause 34: The system according to clause 33, wherein the remote data monitor is configured to read data from the second RFID transducer.

Clause 35: The system according to clause 33, wherein the second RFID transducer is disposed on a control valve of the system.

Clause 36: A method for monitoring air pressure applied to a brake cylinder of a braking assembly of a train with at least one railcar, comprising: delivering a delivered air pressure to an empty-load device; regulating the delivered air pressure with a regulation arrangement of the empty-load device to result in a regulated air pressure; delivering the regulated air pressure from the empty-load device to the brake cylinder; measuring the regulated air pressure with an RFID transducer downstream of the empty-load device; and reading the measurement from the RFID transducer with a remote data monitor.

Clause 37: The method according to clause 36, wherein the remote data monitor comprises one or more of a handheld RFID reader and a stationary RFID reader configured to read data from the RFID transducer as the at least one railcar passes the remote data monitor.

Clause 38: The method according to any of clauses 36 to 37, wherein the RFID transducer comprises a passive RFID system.

Clause 39: The method according to any of clauses 36 to 38, wherein the remote data monitor comprises a transmitter, and further comprising the step of transmitting the measurement from the remote data monitor to a remote database.

Clause 40: The method according to any of clauses 36 to 39, wherein the RFID transducer is disposed on the empty-load device.

Clause 41: The method according to any of clauses 36 to 39, wherein the RFID transducer is disposed on the brake cylinder.

Clause 42: The method according to any of clauses 36 to 41, further comprising: measuring the delivered air pressure with a second RFID transducer in communication with the delivered air pressure; and reading the measurement from the second RFID transducer with the remote data monitor.

Clause 43: A railway vehicle comprising: a braking assembly for braking at least one wheel of a railcar; a brake cylinder; an empty-load device, and an RFID transducer in communication with the empty-load device, wherein the RFID transducer is located downstream of the empty-load device, and wherein the RFID transducer is configured to: measure the air pressure delivered to the brake cylinder of the braking assembly, and generate data on the air pressure delivered to the brake cylinder of the braking assembly; and at least one remote data monitor configured to read data from the first RFID transducer.

Clause 44: A railway vehicle comprising: a braking assembly for braking at least one wheel of a railcar; an RFID transducer in communication with the braking assembly, wherein the RFID transducer is configured to measure an air pressure at a point in the braking assembly, and generate data on the air pressure; and at least one remote data monitor configured to read data from the RFID transducer.

The railway vehicle according to clause 44, wherein the RFID transducer comprises a passive RFID system.

Clause 46: A railway vehicle comprising: a braking assembly for braking at least one wheel of a railcar; an RFID thermometer in communication with the braking assembly, wherein the RFID thermometer is configured to measure a temperature of the at least one wheel, and generate data on the temperature; and at least one remote data monitor configured to read data from the RFID thermometer.

Clause 47: A method for monitoring air pressure at a desired location in an air brake arrangement of a train with at least one railcar comprising: delivering air pressure to the air brake arrangement 100; measuring the air pressure at a desired location in the brake arrangement with an RFID transducer 230, 250; and reading the data from the RFID transducer 230, 250 with a remote data monitor 310.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE DISCLOSURE

It is to be understood that examples according to the present disclosure may assume various alternative variations and step sequences, except where expressly specified to the contrary. It is also to be understood that the specific devices and processes illustrated in the attached drawings, and described in the following specification, are simply examples of the disclosure.

Figure 3:
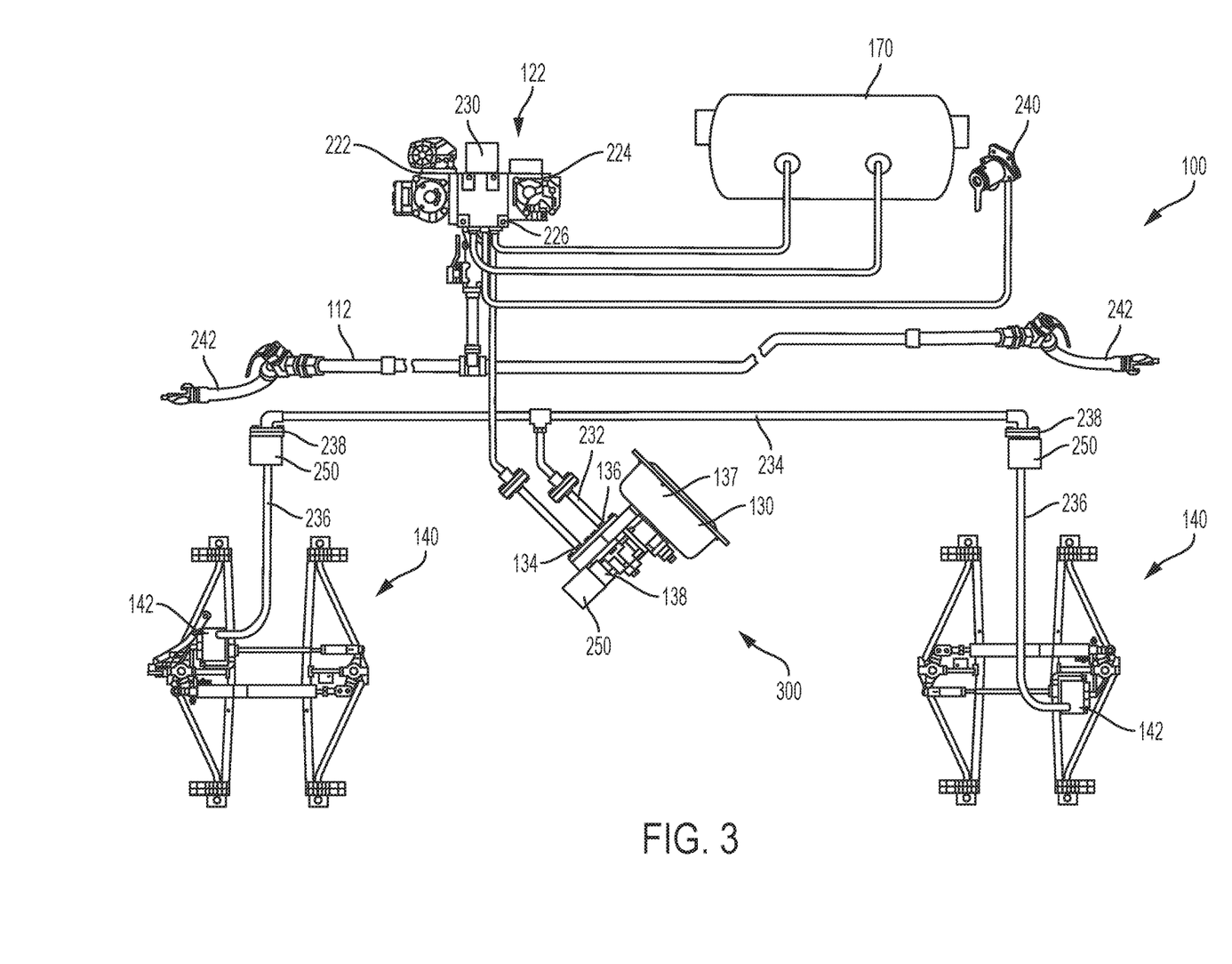
FIG. 3 is a schematic view of an exemplary air brake arrangement having a system for monitoring regulated air pressure according to the present disclosure.

According to examples of the present disclosure, FIG. 3 illustrates a system for monitoring a regulated air pressure applied to at least one brake cylinder 142 of at least one air-operable braking assembly 140 of a train with at least one railcar 160. The system may be applied each of multiple rail cars 160. The present disclosure may be used to monitor regulated air pressure to detect potential abnormal conditions in the air brake arrangement 100, such as a malfunctioning empty-load device 130, and allow for corrective action.

However, it is to be noted that the present disclosure also is useful in a variety additional of vehicles having air brake systems. For example, it is known that large trucks hauling cargo over long distance include similar pneumatic braking arrangements for slowing or stopping the vehicle, and the present disclosure may be used thereon in order to monitor regulated air pressure applied to a brake cylinder. Additionally, while the present disclosure is discussed in terms of its application to braking systems for railcars, it is to be understood to be applicable to known pneumatic braking systems, as well as electronically-controlled pneumatic air brake systems, dynamic braking systems, blended or combination braking systems, emergency braking systems, and the like.

FIG. 3 schematically depicts a piping diagram of an air brake arrangement 100 for a single freight railcar implementing an exemplary system 300 consistent with the present disclosure. The air brake arrangement 100 of FIG. 3 includes a brake pipe 112. It is to be understood that the brake pipe 112 of the single railcar of FIG. 3 may be serially connected to brake pipes of adjacently-disposed railcars by flexible hose couplers 242, which are connected to opposed ends of brake pipe 112.

As shown in FIG. 3, brake pipe 112 is fluidly connected to a valve element 122. A suitable valve element 122 according to this example includes the ABDX® control valve, available from Wabtec Corporation of Wilmerding, Pa. As shown in FIG. 3, the valve element 122 includes an emergency brake portion 222, a service brake portion 224, and a pipe bracket portion 226. The emergency brake portion 222 and service brake portion 224 of valve element 122 are mounted on opposing sides of the pipe bracket portion 226, and are fluidly connected to a combined auxiliary and emergency reservoir 170 of compressed air that is local to the railcar. While it may be preferable for the auxiliary and emergency reservoirs to be combined into a single reservoir 170, it is to be understood that examples consistent with this disclosure include the emergency portion 222 and the service portion 224 each being connected to their own, separate reservoirs of compressed air, as in FIG. 1.

The valve element 122 also may be in fluid communication with a retaining valve 240. An example of a suitable retaining valve 240 consistent with the present disclosure is the RX-3 retaining valve, available from Wabtec Corporation of Wilmerding, Pa.

With further reference to FIG. 3, the pipe bracket portion 226 of valve element 122 is fluidly connected to empty-load device 130 to supply pressurized air to the empty-load device 130 at a delivered air pressure via at least one braking assembly input 134 of the empty-load device 130. The empty-load device 130 includes at least one sensor arrangement (not shown), such as a switch, diaphragm, lever arm, or valve, that is configured to sense a load associated with the railcar, as described with respect to FIGS. 1, 2A, and 2B, above. The pressurized air at the braking assembly input 134 is an "upstream" air pressure, such as the air pressure of the brake pipe 112, or one of the other components of the air brake arrangement 100 that are located upstream of the empty-load device 130. The empty-load device 130 also includes a regulation arrangement 138, schematically shown in FIG. 3, that is configured to regulate the pressure of the air flowing therethrough. It may be preferable for the regulation arrangement 138 to include a proportioning valve. Alternatively or additionally, the regulation arrangement 138 may include regulators, additional valves, pop-off valves, or any other suitable mechanical of fluidic arrangement. The empty-load device 130 further includes at least one braking assembly output 136 which exhibits a regulated air pressure (also referred to as the "downstream" air pressure) from the empty-load device 130. As shown, the empty-load device 130 preferably includes an integral equalizing volume reservoir 137 to ensure proper equalization of upstream and downstream air pressures. A suitable empty-load device according to this example includes the ELX-S™ device, available from Wabtec Corporation of Wilmerding, Pa.

The at least one braking assembly output 136 is in fluid communication with at least one braking assembly 140, and provides the regulated air pressure to at least one brake cylinder 142 on each braking assembly 140. As shown in FIG. 3, braking assembly output 136 may be fluidly connected, via a hose 232 and piping 234, to multiple brake cylinders 142, which each are fluidly connected to piping 234 via a corresponding hose 236 at joint 238. A non-limiting example of a suitable braking assembly 140 consistent with the present disclosure is the TMX® Brake Assembly, available from Wabtec Corporation of Wilmerding, Pa.

As discussed above in relation to the prior art system at FIG. 1, the empty-load device 130 accepts upstream air from the valve arrangement 122 via the braking assembly input 134. The upstream air may be from the brake pipe 112, a hatch reservoir 114 (as shown in FIG. 1), or combined auxiliary and emergency reservoir 170, or the like. Based on the load condition of the railcar 160, the empty-load device regulates the pressure of the air for delivery to at least one brake cylinder 142 of the at least one braking assembly 140. When the sensor arrangement senses that the railcar 160 is in a loaded condition, the regulation arrangement 138 does not regulate the pressure of the delivered air, allowing full application of the brake shoe mechanism 146 to the wheel 148 of the railcar 160. However, and as further discussed above in relation to the prior art system shown in FIGS. 2A and 2B, when the sensor configuration of the empty-load device 130 senses that the railcar 160 is not loaded, or is carrying an insufficient load, the regulation arrangement 138 of the empty-load device 130 regulates the air pressure of the delivered air, and applies a regulated air pressure to the at least one brake cylinder 142, adjusting the force applied by the brake shoe mechanism 146 on the wheel 148. It is to be understood that the regulation arrangement 138 may be adjustable, and the pressure of the regulated air pressure may be adjusted according to operator preference.

In order to ensure that the proper amount force is applied to the wheel 148 by the air brake arrangement 100, it is desirable to monitor the regulated air pressure exiting the empty-load device 130 from the braking assembly output 136 thereof. Consistent with the present disclosure, a first RFID transducer 250 is disposed in fluid communication with a point in the air brake arrangement 100 that is at or downstream from the braking assembly output 136 of the empty-load device 130. As used herein, the term "first RFID transducer" refers to a single or a plurality of RFID transducers that are placed in fluid communication with the air brake arrangement 100 downstream of the regulation arrangement 138 of the empty-load device 130.

Figure 7A:
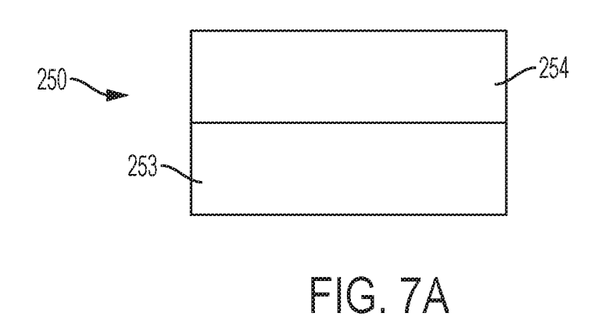
FIG. 7A is a schematic representation of an RFID transducer.
Figure 7B:
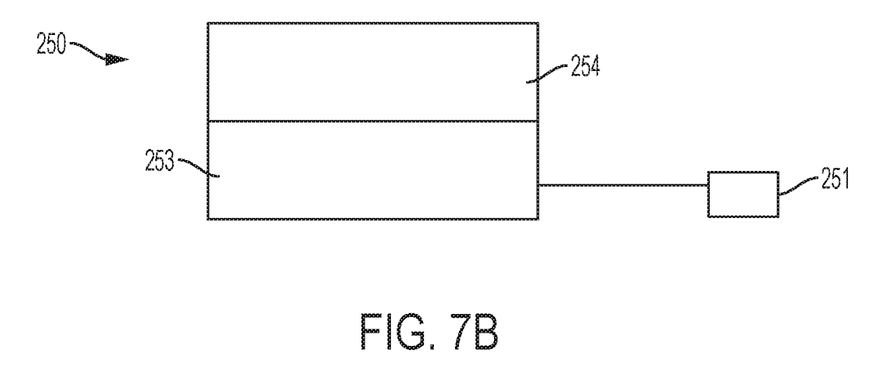
FIG. 7B is a schematic representation of an RFID transducer operably connected to an external power source.

As schematically shown in FIGS. 7A and 7B, the first RFID transducer 250 includes a transducer part 254 and an RFID part 253, which is in operable communication with the transducer part 254. The transducer part 254 of the first RFID transducer 250 is in communication with an air pressure to be measured, and is configured or adapted to measure air pressure and convert the pressure data to an electrical or electronic signal. The pressure data are communicated to the RFID part 253 of the first RFID transducer 250. The RFID part 253 of the first RFID transducer 250 may include, for example, an integrated circuit and memory and may be configured or adapted to temporarily store the pressure data according to operator need or preference. The RFID part 253 of the first RFID transducer 250 may be configured to update pressure data at intervals or continuously. The RFID part 253 may include a transponder. The RFID transducer 250 may be configured to update pressure data on receipt of a trigger event, such as the application of pressure to the brake cylinder 142 or receipt of a radio-frequency signal interrogating the RFID transducer 250 for updated pressure data. The RFID part 253 of the first RFID transducer 250 may be configured to store pressure data over a period of time which may be a set period of time or an indefinite period of time. The RFID part 253 of the first RFID transducer 250 also includes an antenna arrangement configured to transmit data on a radio signal. According to the present disclosure, the first RFID transducer 250 also may be configured to receive data on a radio signal on the antenna arrangement. It may be preferable for the first RFID transducer 250 to include a passive RFID system, as described more fully below. However, it is to be understood that the first RFID transducer 250 may include an active RFID system, which is in wired connection to a battery or other power source, and may periodically transmit data under its own power. It is to be further understood that the first RFID transducer 250 may include a battery or other power source 251 that is activated only when in the presence of a remote data monitor, described below, as shown in FIG. 7B.

In order to measure regulated air pressure delivered to the brake cylinder 142, the first RFID transducer 250 is placed in fluid communication with the air pressure downstream of the regulation arrangement 138 of the empty-load device 130. As shown, the first RFID transducer 250 preferably may be disposed on the empty-load device 130 at a point downstream of the regulation arrangement of the empty load device 130. Additionally or alternatively, one or more first RFID transducers 250 may be placed at the joints 238 connecting hose 236 to pipe 234, or at any other point downstream of the empty-load device 130. It is to be understood that, although the placement of multiple first RFID transducers 250 is shown in FIG. 3, the actual number and placement of first RFID transducers 250 may be arranged according to need or preference.

Additionally, the monitoring system 300 may include one or more second RFID transducers 230. Second RFID transducer 230 may be configured similarly to first RFID transducer 250, but disposed in the air brake arrangement 100 at a location that is not downstream of the empty-load device 130. This configuration may allow the second RFID transducer 230, for example, to measure data on the delivered air pressure. For example, as shown, the second RFID transducer 230 may be in fluid communication with the pipe bracket portion 226 of the valve element 122. It is to be understood that the second RFID transducer 230 may be placed in fluid communication with any point of the air brake arrangement 100 where it is desirable to take a measurement of delivered air pressure. For example, second RFID transducer 230 may be placed in fluid communication with the brake pipe 112, the combined auxiliary and emergency reservoir 170, or any other reservoir on air brake arrangement 100. As used herein, the term "second RFID transducer" refers to one or more RFID transducers that are placed in fluid communication with the air brake arrangement 100 that is upstream of the regulation arrangement 138 of the empty-load device 130. Non-limiting examples of upstream positions include the control valve 122, the combined auxiliary and emergency reservoir 170, the brake pipe 112, or any other place where air pressure has not been regulated by the empty-load device 130. It will be understood that in examples according to the present disclosure, monitoring system 300 may include a second RFID transducer 230, but not a first RFID transducer 250.

Figure 4:
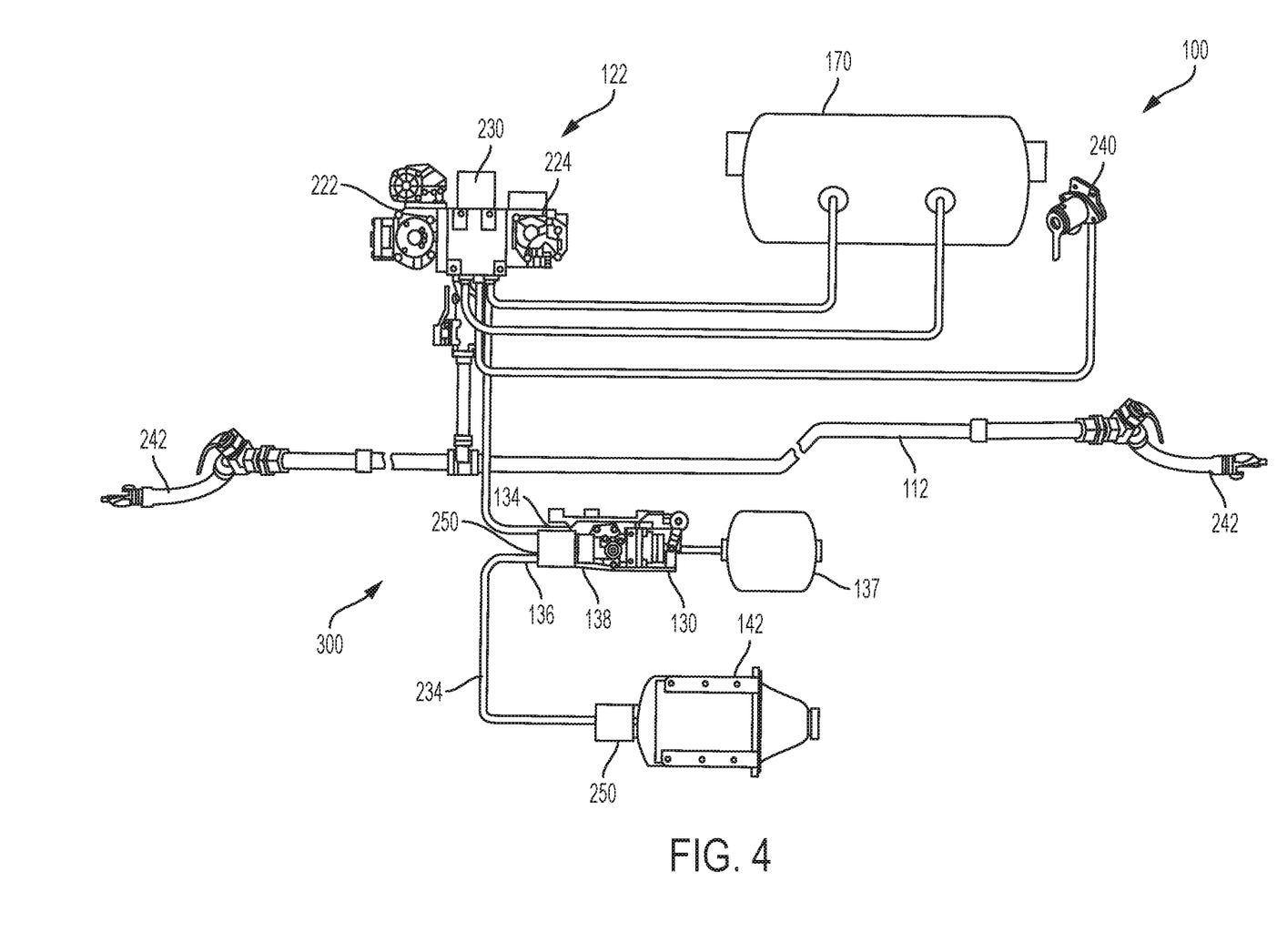
FIG. 4 is a schematic representation of another example of an air brake arrangement having a system for monitoring regulated air pressure according to the present disclosure.

FIG. 4 shows an example of an air brake arrangement 100 similar to the example of FIG. 3. The empty-load device 130 of the air brake arrangement 100 of FIG. 4, however, includes an external equalizing volume 137. An example of a suitable empty-load device 130 according to FIG. 4 is an ELX-B device, available from Wabtec Corporation of Wilmerding, Pa. In order to obtain a measurement of the regulated air pressure, the first RFID transducer 250 may be placed in fluid communication with the air brake arrangement 100 at the braking assembly output 136. As schematically shown in FIG. 4, a first RFID transducer 250 additionally or alternatively may be disposed on a brake cylinder 142. A suitable brake cylinder 142 according to the present disclosure is the ABU brake cylinder, available from Wabtec Corporation of Wilmerding, Pa. In configurations in which the first RFID transducer 250 is disposed on a brake cylinder 142, it may be necessary to dispose additional first RFID transducers 250 on other brake cylinders 142 in the system 300 in order to measure the regulated air pressure applied to each brake cylinder 142.

Figure 5:
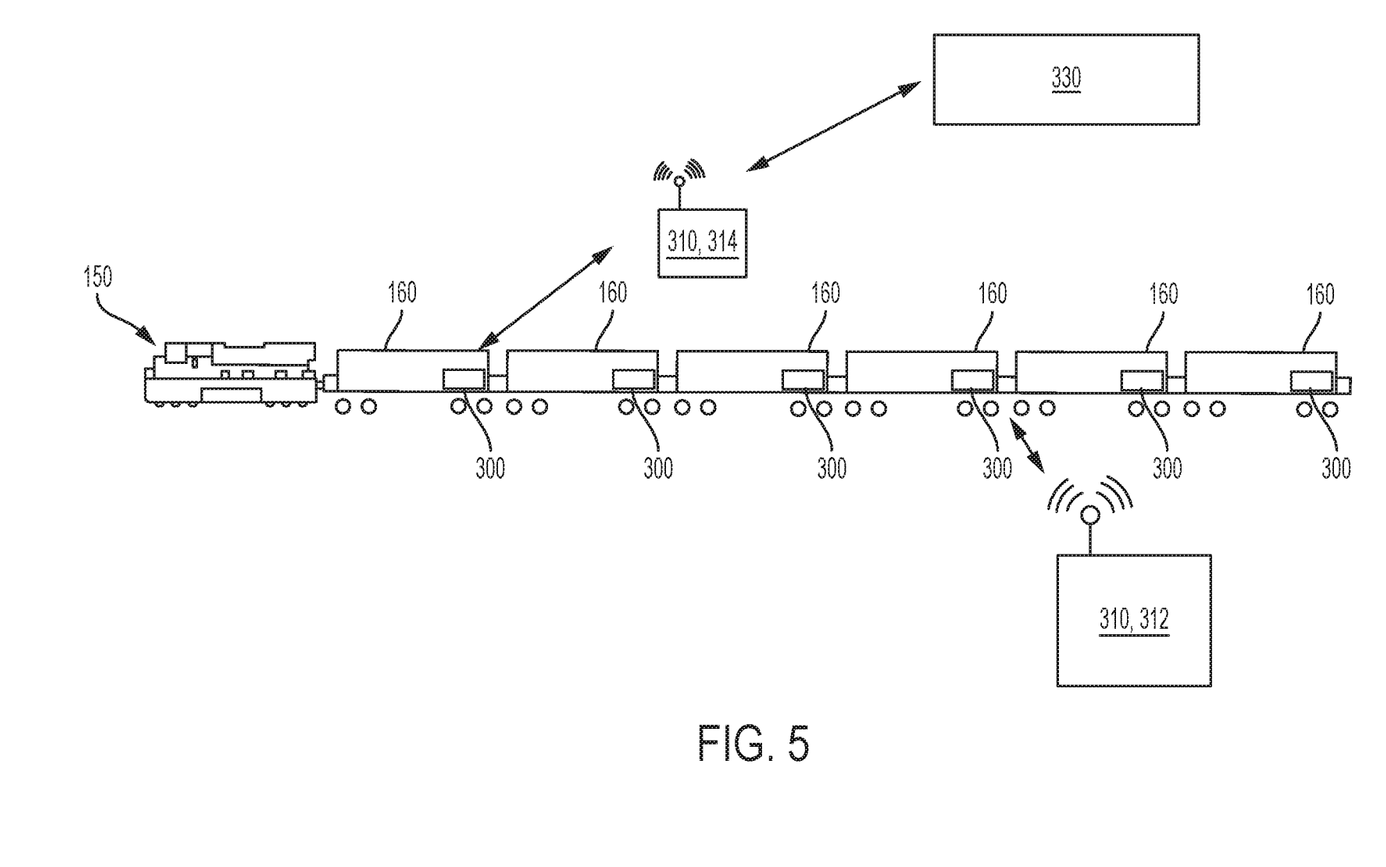
FIG. 5 is a schematic representation of a locomotive and railcars interacting with data monitors according to the present disclosure.

FIG. 5 is a schematic depiction of a train 150 having multiple railcars 160. The railcars 160 are serially connected. Each railcar 160 includes a monitoring system 300 comprising a first RFID transducer 250 according to the present disclosure and as discussed with respect to FIGS. 3 and 4, although it is to be understood that examples of monitoring systems 300 on railcars 160 consistent with this disclosure may also or alternatively include one or more second RFID transducers 230. With reference to FIGS. 3-5, data on regulated air pressure obtained by a first RFID transducer 250 may be read by a remote data monitor 310. Examples of remote data monitors 310 may include a two-way radio-frequency transmitter and receiver, or transceiver, configured to send a radio frequency signal to at least one of a first RFID transducer 250 and to receive a radio frequency signal from at least one of a first RFID transducer 250. The first radio-frequency signal sent by the remote data monitor may interrogate, or "poll," the first RFID transducer 250, activating the RFID part 253 of first RFID transducer 250, as schematically shown in FIGS. 7A and 7B. A transponder on the first RFID transducer 250 may use the first radio-frequency signal sent by the remote data monitor to power a second radio-frequency signal that is transmitted from the first RFID transducer 250 and received by the transceiver of the remote data monitor 310. The second radio-frequency signal may carry pressure data obtained by the first RFID transponder 250 to the remote data monitor 310. The second radio-frequency signal also may carry additional data, such as data identifying the particular transducer, railcar, empty-load device, brake cylinder, position in the air brake arrangement, or the like, associated with the particular RFID transducer. In this manner, pressure data may be associated and tracked with a particular railcar or RFID transducer, which may allow abnormal conditions in an air brake arrangement to be identified with specificity. Additionally, while the above description is directed to a first RFID transducer 250, it is to be understood that a second RFID transducer 230 may be activated and communicate with remote data monitor 310 similarly, and may be include a similar schematic arrangement as shown with respect to first RFID transducer in FIGS. 7A and 7B. Thus, examples of monitoring system 300 that include one or more second RFID transducer 230—either with or without a first RFID transducer 250—would interact with remote data monitors 310 similarly.

As schematically depicted in FIG. 5, examples of remote data monitors 310 may include a handheld RFID reader 312 and a stationary RFID reader 314. A handheld RFID reader 312 may be configured to be carried by an operator and used to poll individual railcars 160 during inspection procedures when the train 150 is stationary, or when the railcars 160 are passing by the operator.

Examples of a stationary RFID reader 314 may be used to read pressure data from stationary railcars 160 as well. Stationary RFID readers 314 may be further used to monitor air pressure data during a braking procedure under real world conditions when a train 150 having railcars 160 equipped with the system 300 according to the present disclosure passes by a stationary RFID reader 314, or an array of stationary RFID readers 314.

Remote data monitors 300 may be configured to transmit the data obtained from the monitoring systems 300 to a database 330. Databases may be stored, for example, on a computing device or plurality of computing devices. Transmission to a database 330 may be over radio-frequency signal, cellular signal, ZigBee or Bluetooth protocol, and the like. The database 330 may be accessible over the Internet. In examples, if measured pressure data indicate an abnormal or unexpected condition on one or more air brake arrangements 100, software in communication with the database 330 may send alerts to a user via email, text message, or voice message, and the like.

With specific reference to FIGS. 3-5, it is to be understood that data on a delivered air pressure obtained by a second RFID transducer 230 also may be read by a remote data monitor as described above.

It is to be understood that an RFID temperature sensor, not shown, may be positioned in communication with one or more wheel 148, and configured to measure temperature data on the wheel 148 before, during, and/or after a braking procedure. Data on the wheel temperature obtained by the RFID temperature sensor may be read by a remote data monitor as described above. Examples of RFID thermometers may include an RFID part, and a temperature sensor part, such as a thermometer part. Examples of RFID temperature sensor according to this disclosure may be passive or externally powered.

Figure 6:
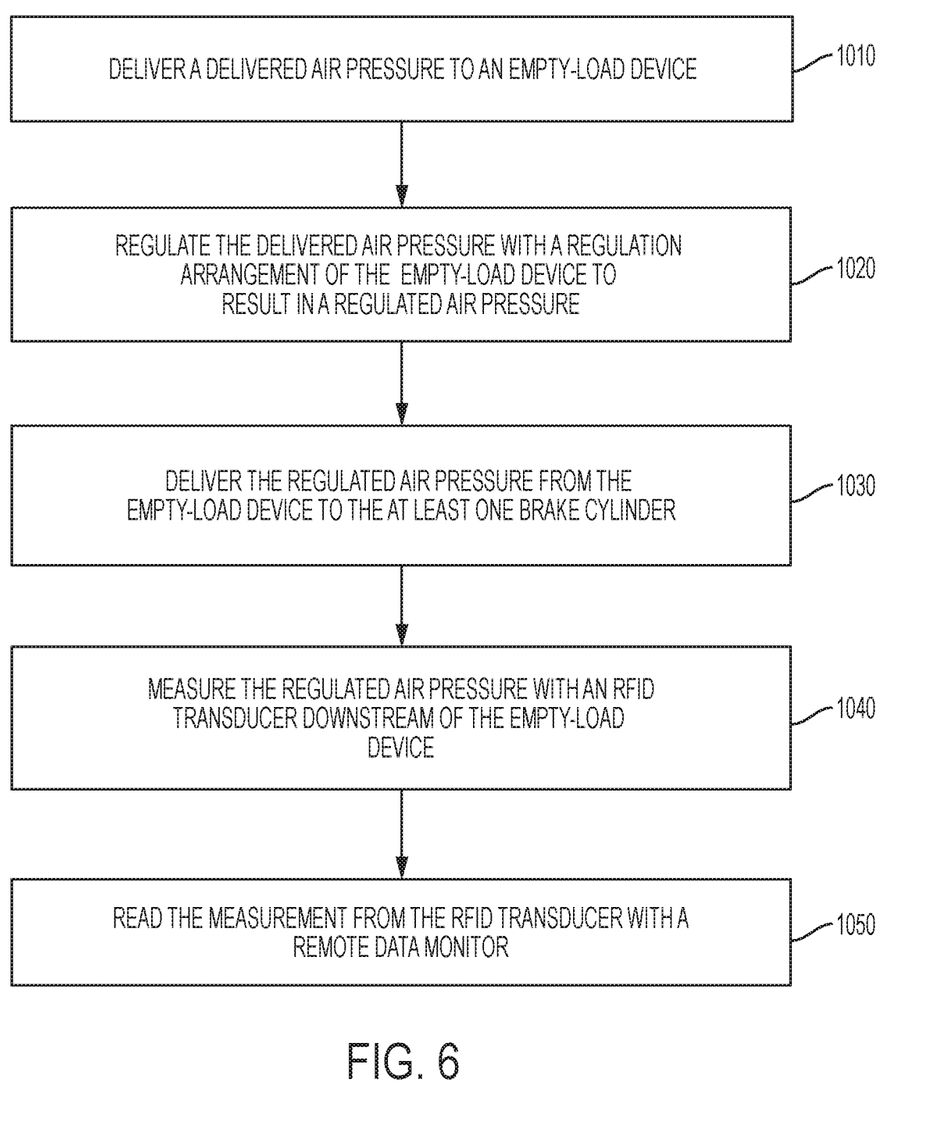
FIG. 6 is a flowchart depicting an exemplary method for monitoring regulated air pressure according to the present disclosure.

FIG. 6 is a flow chart showing steps of an exemplary method for monitoring a regulated air pressure applied to at least one brake cylinder 142 of at least one air-operable braking assembly 142 of a train 150 with at least one railcar 160 consistent with the present disclosure. With reference to FIG. 6, step 1010 includes delivering a delivered air pressure to at least one empty-load device 130. Step 1020 includes regulating the delivered air pressure with a regulation arrangement 138 of the at least one empty-load device 130 to result in a regulated air pressure. Step 1030 includes delivering the regulated air pressure from at least one empty-load device 130 to at least one brake cylinder 142. Step 1040 includes measuring the regulated air pressure with an RFID transducer 250 downstream of the at least one empty-load device 130. Step 1050 includes reading the data from the RFID transducer 250 with a remote data monitor 310.

Figure 8:
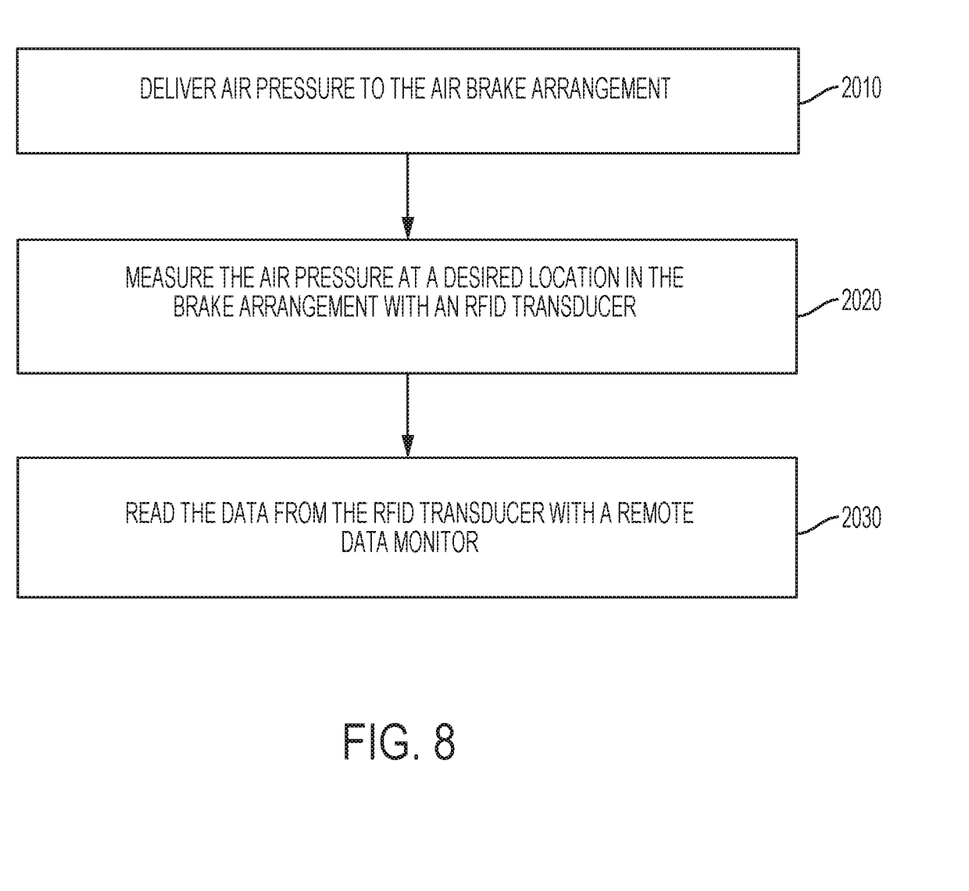
FIG. 8 is a flowchart depicting an exemplary method for monitoring air pressure according to the present disclosure.

With reference to FIG. 8, it is further to be understood that a method for monitoring an air pressure applied within an air brake arrangement 100 of a train with at least one rail car 160 exists that is consistent with the present disclosure. Step 2010 includes delivering air pressure to the air brake arrangement 100. Step 2020 includes measuring the air pressure at a desired location in the brake arrangement 100 with an RFID transducer 230, 250. Step 2030 includes reading the data from the RFID transducer 230, 250 with a remote data monitor 310.

Although the disclosure has been described in detail for the purpose of illustration based on what is currently considered to be the most practical and/or preferred examples, it is to be understood that such detail is solely for that purpose and that the invention is not limited to the disclosed examples or embodiments, but, on the contrary, is intended to cover modifications and equivalent arrangements that are within the spirit and scope of the appended claims. For example, it is to be understood that the present invention contemplates that, to the extent possible, one or more features of any embodiment or example can be combined with one or more features of any other embodiment or example.

What is claimed is:

1. A system for monitoring an air pressure applied to a brake cylinder of a braking assembly of a vehicle, the system comprising:
    an empty-load device;
    a radio frequency identification (RFID) transducer configured to:
        measure the air pressure that is applied to the brake cylinder of the braking assembly, wherein the air pressure is measured in a location that is downstream of the empty-load device, and generate pressure data representative of the air pressure applied to the brake cylinder of the braking assembly; and a remote data monitor configured to read the pressure data from the RFID transducer by communicating a first radio-frequency (RF) signal to the RFID transducer, and the RFID transducer is configured to use the first RF signal received from the remote data monitor to power communication of a second RF signal, the second RF signal including the pressure data that is generated by the RFID transducer and identification data that identifies one or more of the RFID transducer, the vehicle, the empty-load device, or the brake cylinder.

2. The system according to claim 1, wherein the remote data monitor comprises an RFID reader configured to read the pressure data from the RFID transducer as the vehicle passes the remote data monitor.

3. The system according to claim 1, wherein the empty-load device comprises:
a braking assembly input configured to receive a delivered air pressure,
a regulation arrangement configured to regulate the delivered air pressure to form a regulated air pressure, and
a braking assembly output configured to discharge the regulated air pressure to represent the air pressure that is applied to the brake cylinder.

4. The system according to claim 1, wherein the remote data monitor comprises a transmitter configured to transmit the pressure data from the RFID transducer to a remote database.

5. The system according to claim 1, wherein the RFID transducer comprises a passive RFID system that lacks a power source.

6. The system according to claim 1, wherein the RFID transducer further comprises an active RFID system in wired connection with a power source.

7. The system according to claim 1, wherein the RFID transducer is disposed on the empty-load device.

8. The system according to claim 1, wherein the RFID transducer is disposed on the brake cylinder.

9. The system according to claim 1, wherein the pressure data is first pressure data and the system further comprises a second RFID transducer configured to:
measure an air pressure that is applied to the empty-load device, wherein the air pressure applied to the empty-load device is measured upstream of the empty-load device; and
generate second pressure data representative of the air pressure that is applied to the empty-load device.

10. The system according to claim 9, wherein the remote data monitor is configured to read the second pressure data from the second RFID transducer.

11. The system according to claim 9, wherein the second RFID transducer is disposed on a control valve of the system.

12. A method for monitoring air pressure applied to a brake cylinder of a braking assembly of a vehicle, the method comprising:
delivering a delivered air pressure to an empty-load device;
regulating the delivered air pressure with a regulation arrangement of the empty-load device to result in a regulated air pressure;
delivering the regulated air pressure from the empty-load device to the brake cylinder;
generating a measurement of the regulated air pressure downstream of the empty-load device with a radio frequency identification (RFID) transducer; and
reading the measurement from the RFID transducer with a remote data monitor by communicating a first radio-frequency (RF) signal to the RFID transducer from the remote data monitor, and using the first RF signal, by the RFID transducer, to power communication of a second RF signal, the second RF signal including the measurement of the regulated air pressure that is generated by the RFID transducer and identification data identifying one or more of the RFID transducer, the vehicle, the empty-load device, or the brake cylinder.

13. The method according to claim 12, wherein the remote data monitor comprises one or more of a handheld RFID reader or a stationary RFID reader configured to read the measurement from the RFID transducer as the vehicle passes the remote data monitor.

14. The method according to claim 12, wherein the RFID transducer comprises a passive RFID system that lacks a power source.

15. The method according to claim 12, further comprising transmitting the measurement from the remote data monitor to a remote database.

16. The method according to claim 12, wherein the RFID transducer is disposed on the empty-load device.

17. The method according to claim 12, wherein the RFID transducer is disposed on the brake cylinder.

18. The method according to claim 12, wherein the measurement of the regulated air pressure downstream of the empty-load device is a first measurement, and the method further comprises:
generating a second measurement of the delivered air pressure upstream of the empty-load device with a second RFID transducer in communication with the delivered air pressure; and
reading the second measurement of the delivered air pressure from the second RFID transducer with the remote data monitor.

19. A vehicle comprising:
a braking assembly for braking at least one wheel of the vehicle;
a radio frequency identification (RFID) transducer in communication with the braking assembly, wherein the RFID transducer is configured to:
measure an air pressure at a point in the braking assembly, and
generate pressure data representative of the air pressure; and
at least one remote data monitor configured to read the pressure data from the RFID transducer by communicating a first radio-frequency (RF) signal, and the RFID transducer is configured to use the first RF signal received from the at least one remote data monitor to power communication of a second RF signal, the second RF signal including the pressure data that is generated by the RFID transducer and identification data identifying one or more of the RFID transducer, the vehicle, or the braking assembly.

* * * * *

UNITED STATES PATENT AND TRADEMARK OFFICE
CERTIFICATE OF CORRECTION

PATENT NO. : 10,960,870 B2
APPLICATION NO. : 16/127762
DATED : March 30, 2021
INVENTOR(S) : Edward W. Gaughan, William John Potter and Vincent F. Troiani It is certified that error appears in the above-identified patent and that said Letters Patent is hereby corrected as shown below:

In the Claims

In Claim 9 at Column 15, Line 43, the phrase "first pressure data" should recite "a first pressure data".

In Claim 12 at Column 16, Line 11, the phrase "a second RF signal" should recite "a second radio frequency (RF)".

In Claim 19 at Column 16, Line 59, the phrase "a second RF signal" should recite "a second radio frequency (RF)".

Signed and Sealed this
Tenth Day of January, 2023

Katherine Kelly Vidal
*Director of the United States Patent and Trademark Office*